Jan. 21, 1930.  R. A. S. PAGET  1,744,570
APPARATUS FOR PRODUCING SOUNDS
Filed Oct. 13, 1923  4 Sheets-Sheet 1

INVENTOR:
RICHARD A. SURTEES PAGET
by Spear, Middleton, Donaldson & Hall.
Attys.

FIG. 8. (Th Dh)

FIG. 9. (Dh Th) (Mother)

FIG. 10. (F.V.)

FIG. 11. R (Transient) & N.

INVENTOR:
RICHARD A. SURTEES PAGET

FIG. 18.

FIG. 19. (Hola!)

FIG. 18A. (Away)

FIG. 21A. (ƆBA) (Oba)

INVENTOR:
RICHARD A. SURTEES PAGET
by Spear, Middleton, Donaldson & Hall
Attys.

Jan. 21, 1930.  R. A. S. PAGET  1,744,570
APPARATUS FOR PRODUCING SOUNDS
Filed Oct. 13, 1923    4 Sheets-Sheet 4

INVENTOR:
RICHARD A. SURTEES PAGET
by Spear, Middleton, Donaldson & Hall
Attys.

Patented Jan. 21, 1930

1,744,570

UNITED STATES PATENT OFFICE

RICHARD ARTHUR SURTEES PAGET, OF LONDON, ENGLAND

APPARATUS FOR PRODUCING SOUNDS

Application filed October 13, 1923, Serial No. 668,378, and in Great Britain October 17, 1922.

This invention relates to a method of and apparatus for producing sounds, particularly sounds similar in character to the human speech.

It has long been known that the vowel sounds of the human voice are due to resonance in the cavities of the mouth and throat, and that a number of vowel sounds were characterized by different resonances, and further, that certain vowel sounds, such as i (in eat) were characterized by two resonances, but it was generally believed that the lower of these resonances was not of fundamental importance.

Helmholtz attempted to reproduce vowel sounds by passing the vibrating air from a reed pipe through a single resonator. He also attempted to reproduce the vowel sound i by a single resonator with a tubular extension, but so far as I am aware no attempt has hitherto been made to reproduce any voiced sounds by the use of a plurality of Helmholtz resonators.

The resonances recorded by Helmholtz were mostly an octave too low, and his experimental results have not been satisfactorily repeated.

Attempts have been made to reproduce the human voice in organ pipes, but always by the use of a single resonator.

It has also been known that the quality of an organ pipe could be modified by reducing the cross-section of the pipe near its open end, with the object of modifying the overtones, as, for example, in the case of the coned gamba.

It was also shown by Wheatstone, as a development of Kempelen, that certain consonant sounds, such as M and P, could be formed by the opening and closing of a single resonator, with or without a nasal bypass, and this device has since been used in talking dolls.

It is also known that certain series of vowel sounds, namely, ʊ (earth), æ (hat), (up), may be approximately reproduced by blowing through a reed into a tube of variable length in which case there is an apparent production of vowel sounds by means of a single resonator, due doubtless to the fact of the comingling of the fundamental and an overtone. This method of vowel production is of limited application, since it is not possible to alter the resonances independently of one another, and the vowel sounds produced in this way are not, in general, true representations of human vowels.

I have discovered, as the result of a series of experiments made to identify the principal natural resonances corresponding to any given vowel or consonant sound in human speech, that all the sounds of the human voice depend essentially for their formation on the fact that the interior shape of the human mouth and throat and the access to the nasal cavity are so modified by the action of the tongue and other muscles involved that the mouth operates as a plurality of resonators through which the fundamental larynx note passes in series, or in series and parallel as, for example, in nasal vowels and consonants, and that, in the case of the simple vowel sounds, the essentials of their formation depend in every case on the mouth cavity as a whole giving two principal characteristic resonances.

The principal natural resonances corresponding to any given vowel or consonant which it is required to reproduce may be identified either by breathing while the mouth is maintained in position for forming the sound in question, or by tapping the throat and cheeks, or by the use of a stethoscope applied to the throat and cheeks respectively, or the characteristic resonances may be detected by analysis of the phonographic curve produced in any of the well known ways from the breathed sounds in question.

As a result of my experiments I have found that for each of the vowel and consonant sounds there are at least two combined resonances which I term an upper resonance and a lower resonance, and the construction of the combination resonator devices hereinafter described, is based upon this fact.

I have further found by experiment that all vowel sounds can be recognizably reproduced over a wide range of fundamental notes by passing a vibrating or intermittent air current through or by vibrating the air inside the resonators in a combination of two resonators in series, or even of two separate resonators in parallel—the resonators in each case being so tuned as to correspond, with the two principal natural resonances determined as described.

The reproduction of the vowel character depends essentially on the resonance of the two cavities and not on the actual form of the cavities, except in so far as the form is such as causes a variation of the resonances, though the quality of the sound may depend on the form in so far as it affects the freedom of passage of the vibrating air current through the resonator, and the degree of resonance set up. The relative size of the resonators also controls the quality. The scale of size of the pair of resonators may be varied considerably as explained hereafter.

I have further discovered that in the case of the voiced consonants, such as "Th" in "this", V, L, Z, Zh, the characteristics of these sounds in each case are due to the fact that the cavity of the mouth is so formed as to constitute a plurality of resonators, and that the sounds can be produced as in the case of the simple vowel sounds, viz:—by passing a vibrating current of air through or into a number of resonators so tuned as to give similar resonances to those heard in the human voice when whispering or breathing the consonant sounds in question. In some cases as "L", the characteristic is in part to the rate of variation of resonance in changing from the consonant to the associated vowel.

I have further discovered that the formation of the "plosive" consonants, such as T, K, P, depend essentially not on the position in the mouth in which these consonants are formed, but on the effect of the particular movement of the tongue or lips in varying the natural resonances of the mouth cavity during the production of the sound in question.

I have further discovered that it is possible to reproduce various "plosive" consonants, such as T, K and P, by the closure and release at an appropriate point in its length, of a tube open at one end and supplied at the other with air under pressure; also that various sibilant consonants, such as S, H, gutteral Ch and Th, may be similarly produced by a partial closure or constriction of the tube at such positions as to give rise to the appropriate resonances within the tube.

According to the present invention voiced or speechlike sounds are produced by identifying the resonances of the sound as breathed, combining two or more resonators in series and/or parallel—so tuned as to give (when joined together) the combination of resonances heard in the breathed sounds, and energizing the combined resonators by a vibrating reed or diaphragm directly connected to one or more of the resonators. The corresponding unvoiced consonants are produced by substituting a non-vibrating or an aperiodic for a vibrating air current within the resonator.

In the case of transient voiced or breathed sounds, in order to give the characteristic changes of resonances and/or phonation heard in the voice, I combine with the energizing means and combination of resonators as above described, means for—

(1) Varying the pitch of the resonators by variation of their capacity and/or orifices.

(2) By-passing the connection from the larynx or equivalent from one to another resonator or group of connected resonators.

(3) By-passing the larynx or otherwise substituting aperiodic energizing means so as to produce unvoiced sounds.

(4) Producing the appropriate closures and releases of the resonators and/or interrupting or modifying the energizing means.

This invention is applicable to organ pipes for the production of voice-like sounds of any desired vowel or voiced consonant character by the use of a reed (whether free or beating) as the energizing means, or of flue-pipe sounds with a vowel or voiced consonant quality—where the energizing means consists of a mouthpiece of the whistle or flue pipe type.

The invention is also applicable to the production of signal horns, designed to give recognizable directional or warning sounds or the like.

It is applicable to talking dolls and other toys—the object in each case being to provide apparatus whereby the complex combinations of fundamental and overtones existing in the human voice may be produced by the operation of a few suitably tuned resonators, and without the necessity for providing a range of resonators corresponding to the range of overtones occurring in the voice.

I have by way of example illustrated my invention by the accompanying drawings, which are mainly diagrammatic and in longitudinal section.

For convenience of reference, numbers indicating the pitch of the respective resonators are given in the drawings, such numbers, distinguished by being enclosed in square brackets thus [365], are the resonances when the valve controlling the orifice and so affecting the pitch, is closed; the other numbers indicate the pitch when the closure device is open.

Parts between the surfaces of which there is a sliding fit are, for the sake of clearness, shown with the said parts not quite in contact; such parts however usually are a close sliding fit. As stated, the drawings are diagrammatic in character, and in respect to sizes and shapes of resonators and orifices and thicknesses of walls are not necessarily to scale; moreover, in the actual devices there should be no sharp corners or reentrant angles, except where these give intentional resonances or sibilances, the whole of the interior surfaces usually being made smooth and being shaped to follow, as closely as possible, the well known stream line contours.

The practice to be followed in these respects, as well as in the selection of suitable materials, the selection of the most appropriate type of larynx for different purposes and in the relative arrangement or grouping of the resonators is, like the selection of materials for and the voicing of organ pipes, a matter for the discretion of those skilled in the arts to which the invention relates.

It is also to be understood that the illustrations given are not intended to be exhaustive; they are given as typical applications only of my invention as described and claimed herein.

Means for vibrating the air in a manner suitable for use in carrying out my invention, may comprise:—a suitable source of air under pressure equivalent, say, to a few inches of water, and what may be termed an artificial larynx formed for example (see Figs. 1A, 1B and 1C) of a strip of india-rubber $a$, 20 to 30 mm. long, 4—5 mm. wide, and one or two mm. thick laid edgewise between two strips $b$, the adjacent faces of which are concave as at $c$, anchored at its ends in the flattened air passage formed by the concave portions c. Such larynx which is more particularly suitable to devices intended to be blown by the mouth would be attached to the resonator or resonators hereinafter described.

Or the larynx may be formed by a free metal reed such as a harmonium reed, or a beating reed such as an organ pipe reed, or by a wooden reed, such as that of the clarionette, or by a vibrating diaphragm, such as $d$ (see Fig. 1D), in which R1 and R2 are resonators arranged in series with a diaphragm such as that of an electric horn. An artificial larynx constructed as described, or in any other convenient manner will, for the sake of brevity, hereinafter be termed a larynx.

By varying in any suitable manner the pitch of the larynx note so produced, the same vowel can be produced with a pair of resonators over a wide range of fundamental tones, say up to 2 or 3 octaves, though where, as in the case of organ pipes an extended range of larynx notes is required an improved quality may be secured by graduating the dimensions of the resonators so that the capacity of the resonators corresponds approximately to the pitch of the larynx note, as it does in the case of the human voice.

To reproduce any given pair of natural resonances by means of a pair of connected resonators in series, provision must be made to take into account the acoustical effect of the mutual reaction of the connected resonators on one another.

The resonance frequency ($n$) of a single Helmholtz resonator depends, as is well known, on the relation between the capacity (C), the area (A) of the orifice or orifices, and the length (L) of the neck of the orifices, according approximately to the formula $n = \frac{A}{CL}$. Thus, when one double orificed resonator is connected by one of its open mouths to the open mouth of a second resonator connected to a larynx or equivalent, the resonator furthhest from the larynx (which resonator will be herein termed the front resonator) operates more or less as an additional neck or restriction to the front orifice of the resonator nearest the larynx, (which resonator will be termed the back resonator), and thus lowers its resonance; similarly, the attachment of the back resonator to the front resonator operates as a partial closure of the rear orifice of the front resonator, so as to lower its resonant pitch. The extent of the reaction depends on the relative capacities of the two connected resonators, and of the relative areas of the central front orifices respectively.

The ranges of principal resonance for each of the various English vowel sounds for a single voice in the southern English (public school) style of pronunciation are set out in the following table, the usual (international) phonetic and musical notations being employed. These have been determined, and the resonance corresponding to any other vowel sounds may be similarly identified, by the methods described.

| Vowel sound | Upper resonance | Lower resonance |
|---|---|---|
| i as in eat | $d''''2298$ to $e''''2579$ | $\#d'304$ to $\#f'362$ |
| I as in it | $\#c''''2169$ to $\#d''''2434$ | $e'322$ to $\#g'406$ |
| ei as in hay | $c''''2048$ to $d''''2298$ | $a'430$ to $c''512$ |
| e as in men | $\#a'''1824$ to $c''''2048$ | $b'483$ to $d''574$ |
| æ as in hat | $a'''1722$ to $b'''1932$ | $\#d''608$ to $\#g''812$ |
| ɐ as in earth | $f'''1366$ to $a'''1722$ | $\#g'406$ to $\#c''541$ |
| ə as in sofa (last syllable) | $f'''1366$ to $g'''1534$ | $\#c''541$ to $f''683$ |
| ʌ as in up | $\#f'''1448$ to $\#g'''1625$ | $\#f''724$ to $\#g''812$ |
| a as in calm | $d'''1149$ to $f'''1366$ | $\#f''724$ to $a''861$ |
| ɒ as in not | $c'''1024$ to $\#d'''1217$ | $\#d''608$ to $\#g''812$ |
| ɔ as in all | $\#g'''812$ to $b''966$ | $c''512$ to $\#d''608$ |
| ou as in no (first part of diphthong) | $f''683$ to $\#a''912$ | $g'383$ to $b'483$ |
| u as in who (a faint additional resonance at 2434) | $\#d''608$ to $a''861$ | $\#f'362$ to $\#g'406$ |
| U as in put (ditto at 2434) | $a''861$ to $\#c''1084$ | $e'322$ to $\#g'406$ |

Greater ranges for each resonance will be found in the case of other voices and for different pronunciations and it appears that vowel differences are detected rather by their relative differences of resonances than by their absolute pitch.

The resonators may be of any desired shape, e. g. cylindrical, spherical, or rectangular, provided the relation of the capacity of each resonator to the cross-section and length of neck of its orifice or orifices are such as to give the required resonance in each case. The resonators may also be of any desired material, such as wood or earthenware or metal or of a plastic material such as rubber, leather, papier-mâché and similar compositions. The softer materials being less resonant and therefore tending to damp out higher harmonies tend to give a more human and less metallic quality to the vowel sounds. Instead of making the whole resonator of yielding material, it may be made of partly rigid and partly yielding material, the latter being introduced to reduce the higher harmonics. Such yielding surfaces act as partial orifices and thus raise the resonant pitch. In designing a resonator device to give any required pair of resonances, it is, in some cases, convenient to make use, in the first instance, of a plastic material such as clay or plasticine, or a telescopic or adjustable device may be used from which permanent devices may be reproduced when the correct proportions have been ascertained by trial.

Thus, to produce a device giving the vowel sound "i" as in "eat" (see Fig. 1) an upper front resonator, R1 is required having a natural frequency of between 2298 and 2579, and a lower or back resonator, R2, giving between 304 and 362. L is the larynx. The high resonance is given by a cavity R1 of large front orifice T' and of small capacity, and may be conveniently formed as a funnel with a small rear orifice $r^2$; the resonator may be conveniently tuned by varying the length of the funnel. For example, the front resonator, R1, may consist of a funnel about 50 mm. long, with a mouth about 50 mm. diameter, and a rear orifice $r^2$ 5 or 6 mm. in diameter. The pitch of the resonator may be heard by blowing across the open mouth of the funnel. The low resonance is given by a cavity R2 of relatively large capacity—say about 10 cm. long x 50 diameter, and small front orifice $r^2$ giving a resonance of 304 to 362.

Figure 1:
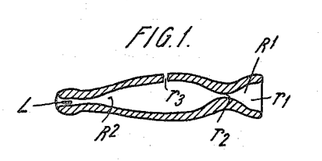
Figs. 1 to 4 represent in longitudinal section a series of typical double resonators producing the respective vowel sounds, i (eat), A up), and ou (first part of the diphthong ou as in no).
Figure 1A:
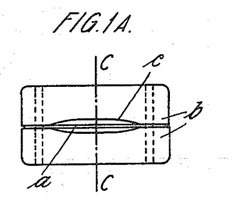
Figs. 1A, 1B and 1C show a simple construction of artificial larynx, Fig. 1A being an elevation, Fig. 1B a plan with the top part removed, and 1C a cross-section on the line C, C.
Figure 1B:
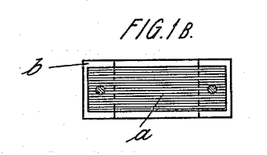
Figure 1C:
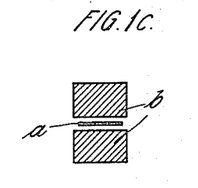
Figure 1D:
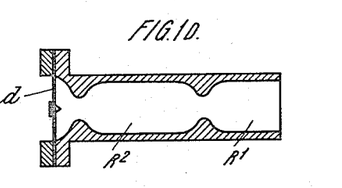
Fig. 1D is a longitudinal section of a vowel-sounding device in which the larynx is in the form of a diaphragm vibrated by any convenient means.

In the case of resonators in series, the small back orifice $r^2$ of the funnel becomes the front orifice of the rear cavity R2, and the latter may be conveniently tuned by varying the capacity of the cavity with the front resonator R1 in place. The pitch of the back resonator R2 may be conveniently heard by tapping the resonator. A small hole $r^3$ may be pierced in the back resonator to enable the resonance to be more easily heard e. g. by holding the hole $r^3$ to the ear and tapping the resonator R2. It is advisable to tune the back resonator after the attachment of the larynx, so as to provide for any lowering of the pitch due to the acoustic resistance of the larynx itself.

Figure 2:
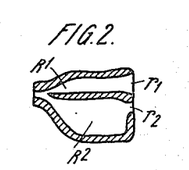
Figure 3:
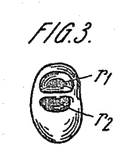

In the case of resonators in parallel (see Figs. 2 and 3), the resonators R1 and R2 may be separately tuned and attached to a single larynx, not shown, as in this case their reaction is negligible, allowance being made for the acoustic resistance of the larynx only. The two resonators when in parallel may, for certain purposes, conveniently be combined as shown with their longitudinal axes parallel, and with the front orifices $r^1$ and $r^2$ semi-circular in shape and in the same transverse plane and with their straight sides adjacent, (see Fig. 3), so that they may be conveniently opened and closed together like a single opening.

Where, as in the case of organ pipes, the resonators are not intended to be manipulated, the two resonators may be attached in any convenient position relative to the larynx. The resonators must be in close proximity to the larynx to avoid parastic resonances in the passages between the larynx and resonators.

Similarly, to produce a resonator device sounding the vowel "O" as in the first part of the diphthong "ou" in "no", the resonances required are upper series 683 to 912, and a lower series 383 to 483. See Fig. 4 in which R1 and R2 are the front and back resonators, $r^1$ and $r^2$ the orifices and L the larynx.

Figure 4:
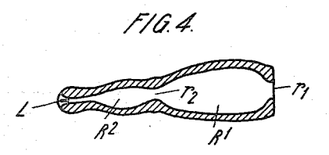

In the case of this vowel, as also in "u" (as in "who") produced in human speech, the resonance of the lower series is frequently produced in the front of the mouth. The front cavity R1 of the resonator device may therefore be designed to give the lower resonance and the back cavity R2 the upper. For example (if a back cavity of about 70 x 50 mm. with orifice about 22 mm. be made to give a resonance of 812, and a front cavity about 125 x 60 with rear orifice 22 mm. diameter and front orifice 24 mm. and giving 645 be joined to it, the mutual reaction will lower the front resonance from 645 to about 362, while that of the back cavity remains almost unchanged at 812, due to the relatively large capacity of the front cavity as compared with the back.

A small reduction of the front cavity will raise the resonance to 383, the frequency required. The resonator device will give an "O" (first part) from which the diphthong ou (as in no) can be produced by reducing the front orifice while the resonator device is being blown.

The sound "O" may also be produced by a resonator device in which the front resonator has the higher pitch, and the back resonator the lower; but the arrangement first described appears to give the better vowel character.

Various other vowel sounds may all be reproduced in the same way, so soon as their characteristic resonances have been determined as above described.

Figure 5:
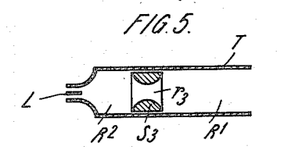
Figs. 5 and 6 show typical devices fitted with arrangements for variably adjusting pairs of resonators.
Figure 6:
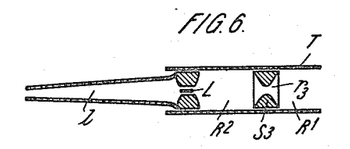

A convenient construction for producing a variety of pairs of resonances consists of a cylindrical tube and stops, see Figs. 5 and 6, in which R1 and R2 are front and back resonances formed by fitting a movable stop S3 with a constricted orifice $r^3$ to a tube T, fitted with a larynx L. In Fig. 6 the larynx L is mounted at the end of the air tube $l$, so as to slide in the tube T and vary the capacity of R2 independently of R1.

In order to produce, according to my invention, consonant sounds, more particularly consonant sounds combined with desired vowels, a device is employed, comprising a larynx and resonances in combination, substantially similar to that described, but modified and/or provided with certain additional parts as hereinafter described.

The reproduction of consonants depends like that of the vowels on securing a combination of resonances similar to those produced in the human mouth by the movements of the lips, tongue, or other muscles.

I have found by experiment that the essential characteristics of the various consonants are due, in human speech, to the nature, the degree, and the direction and rate of the variation of the resonances produced by the movements of the lips, tongue or other muscles, or by the opening or closing of the nasal cavity, rather than to the exact position in the mouth in which these movements are commonly made.

The resonances observed in the case of some typical English consonants are set out in the accompanying table. The resonances of other consonant sounds may be identified in the manner described.

| Consonant sounds | Consonant resonances / Resonances | | | | |
|---|---|---|---|---|---|
| R | 192—271 nasal | 304—406 throat | 767 nasal | 1625—1932 back oral | 1217—1625 front oral |
| L | 192—271 nasal | 304—406 4—6 semitones below associated vowel | 683 | 1217—2048 | high sibilant faint |
| H | | | | | 2895—3249 sibilant |
| Th Dh | | 215—406 | 683 | 912—1932 | 3443—5790 3 semitones lower than for F/V |
| F V | | 228—304 | | 1024—1722 | 5158—5790 3 semitones higher and less pronounced than for Th, Dh |
| Sh Zh | | 304—322 | | 1625—1932 sibilant | 2048—3249 sibilant |
| Y | | 228—271 | 861—912 | 2048—2034 | 6134 sibilant |
| S Z | | 215—304 | | 1149—2298 | 5790—6886 clear sibilant |
| K G double release (Initial K. G.) | | 322—362 | | | 767—3249 2—8 semitones above associated vowel, rising 1—2 semitones at second release |
| K G (Terminal) | | Resonance of associated vowel falls to inaudibility | | 912—2048 1 semitone below associated vowel | 1217—3249 sibilant 4 to 5 semitones above associated vowel. Less loud and sibilant in G than K Double release after closure 1290—2434. 3 to 5 semitones above associated vowel rising about 1 semitone at second release |
| T D (Initial) | | 342—456 louder than for K rising on release, usually 2 semitones lower for D than T | | 1024—2298 resonance constant or falling on release, usually 1—3 semitones lower for D and falling less | 3249—6498 sibilant at release No sibilant heard in D |
| T D (terminal) | | 362 | | 1084—2169 | 3249—6498 |
| T L | | 271—322 | | 1824—1932 faint sibilant constant in pitch | 1932—2434 strong sibilant rising at release |
| P B (Initial) | | resonance rapidly rising to that of associated vowel | | 1084—1625 1024—1534 for B | Slight sibilant rising instantaneously at release No sibilant heard in B |
| P B (Terminal) | | | | | |
| Ng (release as for G) | | 203—228 | 541—724 | 1217—1448 | 2298—2579 faint |
| N (release as for T) | | 203—228 | 683 | 1217—1336 | 1448—2169 |
| M (release as for B) | | 271 | 1217—1448 | 861—1722 | 2434—2579 faint |

In most cases the pitch of the consonant resonance of the human voice is found to vary in accordance with the pitch of the upper resonance of the vowel with which the consonant is associated.

In adapting my invention to produce consonant sounds or combinations of these with vowel sounds, I fit to the combined resonator devices constructed as described, means whereby relatively simple movements of closure and release or partial closure and release of the front or central orifices—or even of the passage leading to the larnyx—may produce similar changes of resonance to those in the human voice though not necessarily in a corresponding position to that of the human mouth. Thus, in a resonator device giving resonances 1534/512 sounding the vowel ʊ as in earth or murmur, (see Fig. 7) having an oval central orifice $r^2$ of 15 x 18 mm. and an approximately hemispherical front resonator R1 with a mouth $r^1$ about 50 mm. in diameter, the complete closure and rapid uniform release of $r^2$ by means of a stopper $r^4$ produces a recognizable p (purr) while a similar release under a lower pressure produces a b (burr). A progressive release, as by the withdrawal of a conical wedge, produces a v (vurr) if the larnyx is sounded, or an f if the larnyx is by-passed by the passage ways $r^5$ shown in dotted lines.

Figure 7:
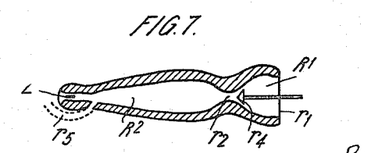
Fig. 7 shows a consonant, or combined consonant and vowel sounding device fitted with closure and release means and a by-pass, producing the sound ʊ (earth).

A partial closure, e. g. with the stopper $r^4$, with sudden release, gives 1 (lurr). If the stopper $r^4$ be inserted in the orifice and moved rapidly from side to side the resonator device produces an L and D heard alternately. In many instances the consonant production is improved by moistening the contacting surfaces so that the first release is due to the fracture of a liquid film.

A partial release device to give an effect such as is produced by closing the central orifice by means of the first finger held obliquely and partially releasing by depressing, so as to produce a release in two stages, gives the consonant K.

Instead of imitating the movement of the tongue or lips, in producing a given consonant and associated vowel, the sounds may in some cases conveniently be reproduced by forming two or more alternative fixed resonant passages, the one being tuned so as to give the vowel and the other giving the resonances of the consonant, and by-passing the air current from one to the other.

This method is applicable to the voiced consonants such as Dh (as in this), Z, Zh, R, N, Ng, V. and to their unvoiced equivalents Th (thin), S, Sh, and F.

In many cases the same back resonator may be used in both combinations, so that the by-pass is arranged between this and a front resonator giving the vowel, the consonant resonator or resonators being either permanently open to the back resonator or closed as the vowel by-pass is opened.

For the production of unvoiced consonants means must be provided for passing air through the resonators without actuating the larnyx, as, for example, by by-passing the larnyx by a rubber tube or other passage designed to be closed at will when the larnyx is required to operate. Thus, a resonator device to produce Dh (or Th) may consist of a multiple resonator (see Fig. 8) having a lower resonator R1 of pitch between say 215 and 406, a middle resonator R2 between 912 and 1932, and a small shallow upper resonator R3 of between 3444 and 5790, the interval between the upper and mid-resonance being an octave and 7 to 10 semitones. An intermediate lower (nasal) resonator $R^n$ vented at $n^1$ with a pitch of about 683 may be added in parallel with R2, as a resonance of this pitch has been heard, though faintly, in the voice, but is not apparently essential.

Figure 8:
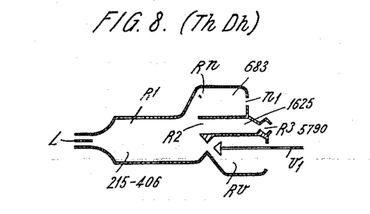
Fig. 8 shows a consonant (Th Dh) sounding device consisting of multiple consonant resonators (including a vented nasal resonator) arranged in series and in parallel, combined with vowel sounding resonators and a closure device adapted to give consonant and vowel sounds in succession.

The upper resonance, if formed by the front resonator R3 requires a shallow and relatively open mouthed cavity with a constricted back orifice.

If the lower resonator R1 be by-passed to a separate vowel sounding front resonator $R^v$ (in parallel with R2 and $R^n$) by a valve $v^1$ or a rubber tube arranged to be closed by pressure, (or if the larynx L be connected to a series of resonators in series or parallel giving the Th resonances and by a valve or rubber tube to a pair of vowel sounding resonators in parallel with the former) closure and release of the valve or the tube will give the consonant and vowel in succession.

In Th the lower resonance is inaudible.

A recognizable Dh can be produced with a vowel resonator attached to a larynx by a short length of rubber tube, namely, by a partial constriction and release of the tube—in this case the consonant character depends on securing the proper constriction at such a distance from the end of the tube opening into the larnyx as to give the sibilant resonance. In the case of a tube 6 mm. diameter this length was found to be 65 to 75 mm. or 85 mm.

Figure 9:
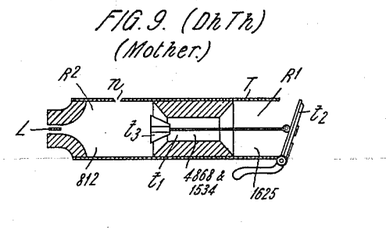
Fig. 9 shows a device adapted to produce consonant sounds (Th Dh) and the word "mother."

The Dh, Th sounds can be produced in resonator devices, for example;—either by complete closure and release of the passage between larynx and back resonator of a combination of resonators giving the consonant resonance with a double resonant vowel resonator (open) in parallel with the consonant resonator; or, by complete closure and release of the central orifice of a vowel resonator of which the back resonator is in communication with appropriate consonant resonators, or by the partial closure and release of a passage between the larynx and back resonator, or between front and back resonators at such position as to give the higher resonance in the passage. Thus, a multiple resonator to produce the word "Mother" may consist of a cylindrical body T (see Fig. 9) divided into two resonators, R1, R2, by a tubular passage $t^1$ about 65 mm. long. The resonance of the back resonator may be 812 and that of the front resonator 1625. The front resonator is provided with a hinged lid or equivalent $t^2$ while the back resonator has a small nasal opening $n$. On blowing the model by the larynx L and opening the mouth $t^2$, the sound MA is produced. On further opening the mouth of the front resonator a grooved stopper or partial constrictor $t^3$ is drawn into the mouth of the central tubular passage $t^1$ so as to constrict it and produce the resonances characteristic of Th and Dh. The stopper may conveniently be grooved, as indicated, so as to ensure the right degree of constriction when drawn into the mouth of the central tubular passage by a wire or equivalent attached to the mouth $t^2$; the wire may be supported by a loop or bearing, not shown, to ensure its entry into the mouth of the passage $t^1$. As the mouth $t^2$ is partially closed again the vowel sound is repeated.

V F sounds

The characteristics of these are a lower sibilant resonance of 228 to 304, and intermediate resonance of 1024 to 1722, according to the resonance of the associated vowel, and a strong sibilant front resonance of about 5158 to 5790.

Resonator devices to sound V or F may be made by forming a narrow passage or slit 1 to 2 mm. broad by say 2 cm. long in a cover closing the mouth of a vowel sounding resonator device and covering the mouth of the slit with a hood 3 mm. high which forms the consonant resonator the front edge of the hood projecting say 10 or 12 mm. beyond the mouth of the slit, so that the air emerging through the slit is deflected and resonates or whistles in the hood.

The sounds V or F may also be formed as already described, by a partial closure of the central orifice of a vowel sounding resonator device so that the air whistles past the constriction—which thus takes the place of the slit above described—into a cavity giving the sibilant resonances.

Figure 10:
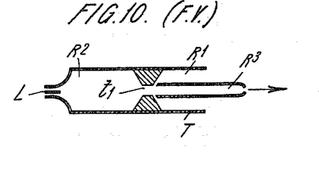
Fig. 10 shows a device with a movable constricted resonator fitted to a central orifice, and adapted to give F. V. sounds.

The closure may be by a conical plug or equivalent or by the constriction of the central orifice itself. Or the F sound may be produced by the simple constriction of a tube or passage giving the lower sibilant. Thus, a constricted tubular resonator, R3 (see Fig. 10) may be applied to the fixed central orifice $t^1$ of a vowel sounding resonator $R^1$ $R^2$, so as to by-pass the front resonator $R^1$. The best consonant is produced by applying the open end of the constricted tube to the central orifice. On withdrawing $R^3$ longitudinally the resonances change to those of the vowel.

Z (S) sounds

The characteristics are a very low lower resonance of about 215 to 304—probably of no appreciable effect in the unvoiced S—a middle resonance of between 1149 and 2298, and a very high top sibilant resonance of about 5790 to 6886. This latter is the essential component of the S Z sound.

This sound can be reproduced in a suitable resonator device by connecting a front resonator of large orifice and small depth giving 5790 and with a constricted back aperture to give sibilance to a mid resonator giving (when attached to the front resonator) a pitch of between 1149 and 2298. Since in S and Z the high resonance is the more pronounced, the resonance of the mid resonator may be reduced or throttled by elongating the passage between the front and mid resonators.

Alternatively, the same sound may be produced by placing the two resonators in parallel and regulating their relative resonance by constricting the back orifice to the lower resonator so that the less air passes through it.

Another method of producing S and Z in a suitable resonator device is by joining the front and back resonators of a vowel resonator device by a rubber tube or equivalent passage and constricting the passage at such a distance from its open end—say 10 to 13 mm.—as to give the upper resonance—the intermediate resonance being given by the front resonator of the device, and the low resonance by the back resonator. This method gives a good production of vowel and consonant in sequence.

Similarly, S with an associated vowel can be produced by a partial closure of a rubber tube between the larynx and back resonator or even of a tube leading to the larynx, the constriction being made in each case at the correct distance from the open end of the tube to give the upper sibilant resonance.

R sounds

The characteristics of the untrilled "R"—of which the west of England r is a pronounced and strongly aspirated form—are a faint very low resonance of 192 to 271, a lower resonance of 304 to 406, a nasal resonance of about 767, an intermediate resonance of from 1217 to 1625, made in front of the human mouth, and an upper resonance of 1625 to 1932, made behind the tongue. The upper resonances are in general from 3 to 5 semitones apart, and their absolute pitch depends on that of the vowel resonance with which the consonant is associated. The release is a progressive one, i. e. such as to give a gradual change of resonances. Mechanically the production of this consonant is similar to that of D, but with a partial instead of a complete closure prior to the release, and nasal passage open.

Figure 11:
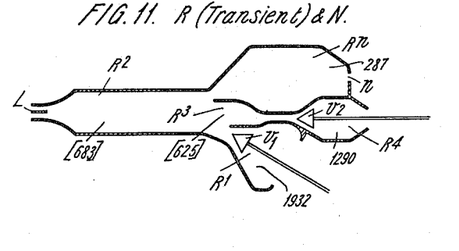
Figs. 11 and 12 show further modifications of consonant (R transient, N, Sh, Zh) multiple sounding resonators combined with vowel sounding resonators and closure device, and adapted to give the consonant and vowel sounds in succession.

A resonator device to produce R sounds may be formed of four consonant resonators in series or parallel with a by-pass to a vowel sounding device. A single back resonator, $R^2$, (see Fig. 11) common to both vowel and consonant, can be connected to a pair of consonant resonators, $R^3$, $R^4$, and to a front (vowel) resonator, $R^1$; a nasal resonator $R^n$ may be attached to the back resonator in parallel with $R^3$. In this case the consonant is formed by closure of the vowel valve $v^1$ followed by a simultaneous release of the vowel valve and closure of the consonant valve $v^2$. Exact timing of the release and closure is necessary for the production of the untrilled R in this way. It is probable that in the human voice the 683 resonance is produced in the nasal cavity but the arrangement described gives a good transient R.

Sh, Zh sounds

The resonances are:—lower 304 to 322, middle 1625 to 1932, upper 2048 to 3249. The mid resonance is the more pronounced but both the mid and upper resonances are sililant.

Figure 12:
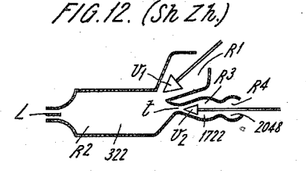

These sounds are produced in a resonator device in which a constricted passage, $t$, (see Fig. 12) is formed between the back resonator R2 and the mid resonator $R^3$, so that a sharp stream of air is directed into the mid resonator, and a relatively large orifice between the middle and front resonator $R^4$. A vowel resonator $R^1$ may be added in parallel with valve $v^1$. On blowing the model with the valve $v^1$ closed, the sound Sh or Zh is produced (according to whether the larynx is blown or by-passed). On closing the consonant valve $v^2$ and opening $v^1$ the vowel sound is produced.

Figure 13:
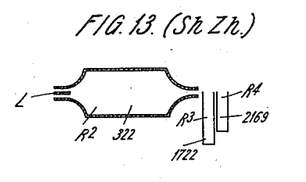
Fig. 13 shows a combination of a Helmholtz resonator and two tubular resonators, e. g. for producing the sound Sh.

The mid resonator may be formed as a tube of appropriate length to give the upper resonance. Or the two upper resonances may be produced by causing a current of air from the orifice of the back resonator $R^2$ to pass as a jet over the orifices of two tubular resonators, $R^3$, $R^4$ as in Fig. 13.

Ng sound

Figure 14:
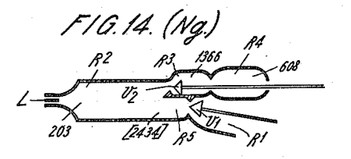
Fig. 14 shows a further modification of consonant (Ng) sounding multiple resonators combined with vowel sounding resonators and two valves.

The characteristics of this sound are a faint upper resonance of between 2298 and 2579, a second, more sibilant resonance between 1217 and 1448, a third resonance between 541 and 724, and a lower resonance made in the throat of between 203 and 228. This sound may be reproduced by a device, (see Fig. 14), comprising a cavity $R^3$ giving 1366, a sibilant passage or cavity $R^5$ giving 2434 and opening into or adjacent to the cavity $R^2$ tuned to 203 and an additional resonator $R^4$ giving 608, all connected to one larynx L. A front (vowel) resonator $R^1$ may be joined through a valve $v$ to the cavity $R^5$ or $R^2$. By alternately opening and closing the valve $v^2$ while the valve $v^1$ is closed or opened the consonant Ng is produced in association with the vowel.

M sound

The characteristics of this sound are two resonances, each varying with the associated vowel, and a lower invariable throat resonance, together with a faint upper resonance of about 2434 to 2579.

Of the upper series the one varies from 861 to 1722; the other varies from 1217 to 1448.

The lower series is constant at 271.

Figure 15:
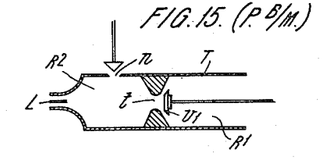
Figs. 15 and 16 show consonant (P. B. D.) sounding devices with an open by-pass.

The M sound may be recognizably produced by a release of the mouth or of the central orifice, $t$ (see Fig. 15) of a resonator device $R^1$, $R^2$, by means of a valve $v^1$ but with an open by-pass $n$ either at the mouth or through a separate "nasal" passage formed in the front or back resonator, so as to give a preliminary hum before the release and a less sharp change of resonance. The same device with $n$ closed produces the consonant P.

Figure 16:
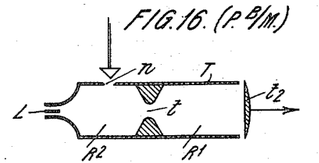

Fig. 16 shows an alternative, in which the sounds M and P are produced as in the human mouth by closure and release of the open end of $R^1$ by a suitable door or valve $t^2$, R2 being fitted with a valved nasal orifice $n$, opening to air (as shown) or to a nasal resonator.

N sound

The characteristics are an upper resonance varying from 1448 to 2169, an intermediate resonance, a nasal resonance of about 683, and a lower resonance of 203 to 228.

In general the characteristic upper resonance of N is 2 to 4 semitones higher than that of M (excluding the faint upper resonance 2434—2579) from the same associated vowel while that of Ng is about 7 semitones higher than N. The middle resonance of N varies from 1217 to 1366. The initial release of N is analogous to that of T at 2169—2048, but with a nasal by-pass open during phonation and release.

A resonator device to produce N sounds comprises a "plosive" release between larynx and back resonator of a vowel sounding device with a nasal by-pass through a resonator giving 1722. (The same release with nasal passage closed will give T, or, with passage constricted, will give Dh).

Figure 17:
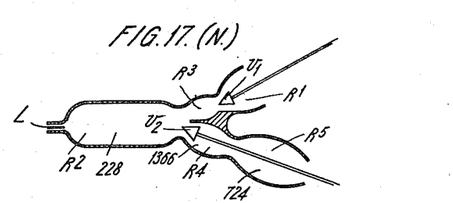
Fig. 17 shows a further modification of consonant (N) and vowel sounding device fitted with two valves.

A preferable arrangement (see Fig. 17) consists of a back resonator $R^2$ giving 228 connected directly to an upper resonator $R^3$, 2434, and through a valve $v^2$ to a pair of resonators R4, R5 in series (1366 and 724). A front (vowel) resonator R1 is connected through a valve $v^1$ to the resonator R3; alternate closing and release of the two valves gives the N and vowel in succession.

L sounds

The principal characteristic resonances of L are an upper resonance of 1217—2048,—a middle resonance of 683, and a lower resonance of 304—406, depending on the lower resonance of the associated vowel—and in general 2 or 3 tones below that of the vowel, and a low resonance 191—271.

The L sound depends also largely on the resonance curves of the upper and lower resonances, which are in general a steeply ascending curve of about 5 semitones for the resonance at the moment of release, and a nearly horizontal curve (i. e. an unvarying pitch) for the upper resonance.

In the appropriate resonator device, L may be produced by a partial closure, not so constricted as to produce sibilance, and a rapid release either of the front or middle orifice of a vowel sounding resonator. Thus a sudden mouth-release fitted to a resonator device giving lower resonance 541 and upper resonance 1366, and adapted to raise the lower resonance to 724, gives a good La.

Figure 18:
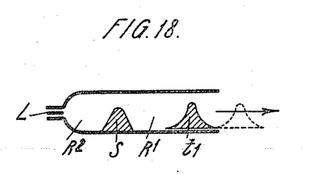
Fig. 18 shows a consonant (L) sounding device fitted with a movable plug forming a partial closure.

The release may be produced by a rapid downward or outward motion, for example, by the pressing in and release of a rubber sheet forming one side of a front resonator or by the withdrawal of a plug cover or equivalent, (see Fig. 18), in which $t^1$ is a movable plug forming a partial closure of the front orifice of the resonator R1. Alternatively, the closure of the middle orifice of a vowel sounding device may be similarly modified.

Figure 19:
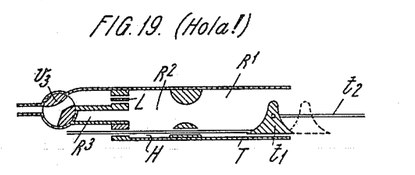

Fig. 19 shows the invention applied to a signal horn to give the sound "Hola" as in French. In this case the tube T is fitted with a reed L, and with a two-way valve $v^3$ by which a current of air may be directed (with interruption) either through the reed L or through the H-sounding tubular resonator R3, (hereinafter described). Both the reed L and the resonator R3 open into the resonator R2. The movable stop $t^1$, which may be operated by a rod $t^2$, is adapted to give a variable opening to the resonator R1. In its retracted position the resonances are tuned to those of the vowel "O"—in its advanced position (shown in dotted lines) the resonances are those of a. The rapid transition gives the consonant L.

H sounds

Figure 19A:
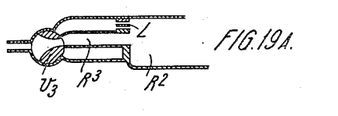

The characteristic resonance of this consonant is a high sibilant of between 2895 and 3249, varying with the resonance of the associated vowel. This sound can be reproduced by the resonance of a tube constricted at 30—40 mm. from its open end. Thus, an aspirated vowel may be produced as in Figs. 19 and 23, in which the tubular resonator R3 is applied in one case to the orifice at which the air enters the resonator from the larynx L, (see Fig. 23) and in the other forms an alternative passage, (see Figs. 19 and 19A).

Figure 23:
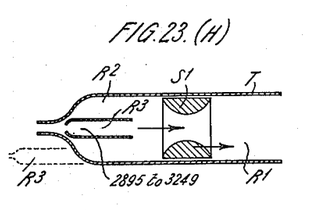
Fig. 23 shows a consonant (H) sounding device with a constricted tubular resonance and a movable stop.

To give the best result the larynx should be by-passed, as in Fig. 19, so that phonation does not begin till after the aspirate. In Fig. 23 the H sounding tube may be external to the back resonator, as indicated in dotted lines at R3—the air supply being switched over from the H tube to the larynx by a 2-way valve such as $v^3$ in Fig. 19.

K G sounds

In the voice the characteristics of K are three-fold: (1) An upper resonance of 767—3249 (depending on that of the associated vowel) which rises about 1 to 2 semitones during the release. (2) Release in two stages, i. e. consisting of two very instantaneous and low pressure releases in rapid succession—as compared with a single less instantaneous and high pressure release in T referred to hereinafter. (3) A lower resonance of 322 to 362.

In general the resonance is from 2 to 8 semitones higher than that of the associated vowel.

In terminal K or G the resonances at closure comprise an upper sibilant 1217—3249 about 4—5 semitones higher than the upper resonance of the associated vowel, and an intermediate resonance 912—2048 about 1 semitone lower than the upper resonance of the associated vowel.

The lower resonance of the associated vowel falls to inaudibility. At release of the closure the upper resonance is 1290—2434, rising during release by about 1 semitone.

Figure 24:
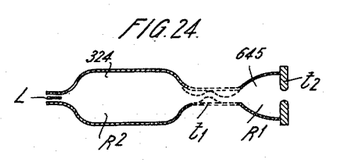
Figs. 24 and 25 show consonant (K. H.) sounding devices with elastic wall type closure devices.

In a suitable resonator device, K may be produced in a variety of ways, e. g. by a progressive release of the central orifice, (see Fig. 24), in which closure and release of a rubber tube $t^1$ operates so as to give the semitone rise in the upper resonance, the quality being improved by moistening the contacting surfaces and by making the release operate over a relatively long surface. In this case the semitone rise is due to the fact that the release at $t^1$ forms an appreciable increase of orifice in relation to that formed in the cover $t^2$. With the cover removed there is no appreciable rise of resonant pitch, and the consonant formed by release of $t^1$ is more like the "T" sound. Or in a central orifice about 15 mm. diameter, the closure and release may be produced with the finger or equivalent mechanical closure by tilting it in the orifice.

Figure 25:
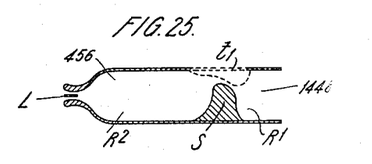
Figure 26:
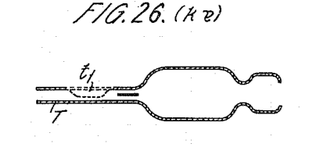
Fig. 26 shows a modification of consonant (Kʊ) sounding device in which the elastic wall type closure device is on the inlet side of the larynx.

Or K may be produced by forming one side $t^1$ of a vowel sounding device of rubber sheet, (see Fig. 25) in which the closure and release is produced by pressing the rubber sheet $t^1$ is such as to give the rising sibilant resonance and release by stage as above described.

K can further be recognizably produced by full closure and release of a rubber tube at 40 mm. from its open end (giving resonances 2579 rising during release to 2895 together with lower resonances due to the capacity of tube behind the closure) or by a similar closure and release at 60 mm. from the open end of the tube.

Figure 27:
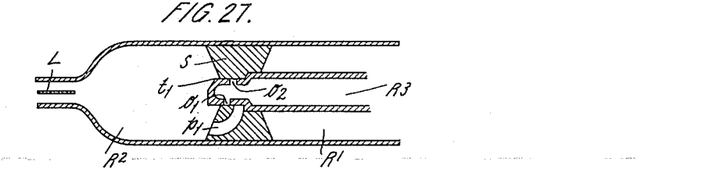
Fig. 27 shows a further modification of K sounding device in which air is admitted in two stages through orifices controlled by a resonator tube adapted to be progressively withdrawn.

(Partial closure at the same positions produce sounds like Oh, as in the Scottish "Loch.") For example, K with an associated vowel may be produced as in Fig. 27, in which R1, R2 are the front and back vowel resonators, and R3 is a K sounding resonator to which the air is admitted in two stages through the orifices $o^1$ and $o^2$ to which the air in R2 is successively admitted, by the passage $p^1$ and by the annular space between the narrow portion $t^1$ of the tube R3 and the enlarged portion of the orifice in S, as the tube is progressively withdrawn. The complete withdrawal of the tube produces the vowel sound.

In general the quality of the consonant is improved by moistening the contacting surfaces.

G sound

This has the same resonances as K, but with the upper resonances less sibilant and softer.

The resonator device is made in the same manner as for K, but is blown with a reduced air pressure.

T D sounds

The characteristic resonances of both these consonants are a single upper and lower resonance varying with those of the associated vowel, and a single release not so rapid as that of P and B devices, or as the individual releases of K and G devices. There is also in T a faint high sibilant, at release, of 3249—6498.

The upper resonance is in general equal to or higher in pitch than that of its associated vowel, so that the initial resonance is maintained or lowered in passing from the consonant to the vowel or raised vice versa.

The lower resonance is in general equal to or lower than that of the associated vowel, so that the lower resonance tends to rise in passing from consonant to vowel and vice versa.

In terminal T and D, the resonances are in general the same as for the initial consonants. Air pressure (without phonation) is continued till after release of the closure, giving final resonance of 1084 to 2169, together with the high sibilant.

Figure 28:
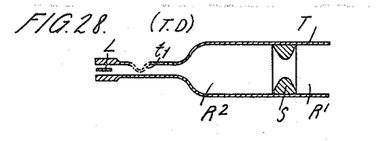
Figs. 28, 29 and 30 show consonant sounding (T. D.) devices in which the closure means control high or low air pressure supplies.
Figure 29:
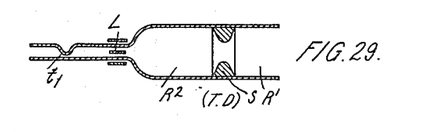

In suitable resonator devices, T and D can be produced with high or low air pressure respectively by pressure and release of a rubber tube, or equivalent valve, forming a central orifice passage, the closure being preferably at such a distance from the open end of the tube as to give the upper resonance required. For example, in Fig. 28, the closure and release $t^1$ is situated at a point 10 mm. from the open end of the passage from the larynx L to the back resonator R2 of the vowel resonator R1, R2. In Fig. 29 the closure and release $t^1$ is situated at a similar distance behind the larynx L. The release should be over a short surface and less rapid than for P. The higher pressure gives greater sibilance to the upper resonance. Moist surfaces improve the quality.

Figure 30:
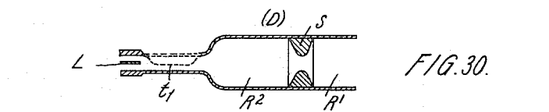

Fig. 30 shows a more progressive closure and release $t^1$ suitable for the production of the consonant D. A lower pressure improves the character of the D sound.

Instead of activating a system of resonator by means of an artificial larynx, I find that this may be also effected by a whistle—in which case a whistle note is produced having a vowel quality and with a fundamental note depending on the resonant pitch of the cavity with which the whistle communicates. This device is especially applicable to organ pipes, enabling a variety of vowel characters to be given to whistle pipes.

Figure 31:
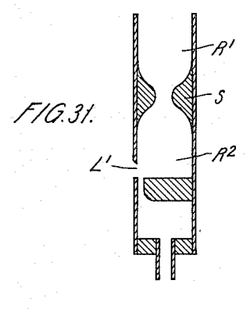
Figs. 31, 32, 33 and 34 show typical examples of the application of the invention to organ pipes or whistle actuated resonators.

Fig. 31 illustrates diagrammatically a whistle-actuated double resonator in which the larynx is replaced by a mouthpiece L' of the usual organ pipe type, and the pipe (which may be of square or round section) is divided into the front and back resonators R1, R2 by the stop or constriction S.

In designing whistle-actuated vowel sounding pipes allowance must be made for the rise of pitch of the back resonator R2 due to its relatively large opening to air at L'. This necessitates a corresponding increase of capacity of the resonator R2 and/or an increase of the constriction at S.

In forming a scale of such pipes the vowel quality will change progressively as the whistle resonance is raised, whereas in the case of reed pipes the same or a different vowel character may be given to a succession of notes.

Though the vowel character of a combination of resonators is largely independent of their shape, the quality of the sound is dependent on the form of the cavity through which the vibrating air current passes.

This, to give the best results, should be such as to avoid parasitic sibilance or unnecessary throttling of the air current and to give the maximum of resonance.

Since every passage or cavity through or into which the vibrating air passes produces a characteristic resonance, it is important that all unnecessary passages and cavities be eliminated, and, in particular, that the larynx be in as direct communication as possible with the resonator or resonators with which it is combined.

Reference has been made to various instances in which consonant sounds may be produced by total or partial closure and release of a rubber tube through which an air current (vibrated or not by a larynx) is passed.

For convenience of reference, particulars are set out below of the principal resonances observed and the corresponding consonant sound heard on release of a rubber tube ¼″ internal diameter and about 3 feet long at the distance named as measured from the open end of the tube.

Resonances of a rubber tube (¼″ int. diam. x 3 ft. long) on full closure and release

| Distance from open end (mm.) | Consonant | Resonance |
|---|---|---|
| 10—15 | T. | 6498 and over of S. |
| 25—27 | T. | 3249 at 27 mm. |
| 40 | K. | 2579×+483+161 rising to 289. |
| 60 | K. | 1290. |
| 80 | T. | 966. |
| 85 | P. | 861. |
| 100 | T. | 812. |
| 140 | T. | 541. |
| 170 | P[K].* | 483. |
| 200 | T[P].* | 383. |
| 215—20 | P. | 362. |
| 240 | T. | 322. |
| 350 | P[K].* | 215. |
| 515 | T. | 430. |

* The letter in brackets indicates that the consonant heard has also traces of this sound.

ON PARTIAL CLOSURE (ADJUSTED TO GIVE BEST CONSONANT EFFECT)

| | | | | |
|---|---|---|---|---|
| 10 | S.* | 322 | | 6498 sibilant. |
| 13 | S. | 322 | | 6886 sibilant. |
| 30—40 | H. | | 2895—3249 | |
| 40 | Oh (loch) | | 2895+lower resonance. | |
| 60 | Ch. | 483 | 1625 | 3249 |
| 75 | Th. | 483 | 1448 | 3249 |
| 78 | F. | 430 | 1366 | 4338 |
| 85 | Th. | 406 | 966 | 3249 |
| 140 | F. | (406) | 1084 | 3249 |

*Note.—Full closure and partial release at 10 mm. gives TS.

The invention is applicable to the following arts or industries among others:—organ pipes and wind musical instruments generally, to give speechlike character; air or electrically operated signal horns, syrens and the like; speaking dolls and the like toys.

In applying the invention to organ pipes to produce voice-like sounds, the resonators may be made of wood or metal or of a more yielding and nonresonant material, such as leather or the like. Or they may be made in part of yielding and in part of relatively non-yielding material. The yielding portions of the resonator walls operate as partial orifices so as to raise the resonant pitch, which must be compensated for (as already explained) by increasing the capacity of the resonator and/or reducing the area of its orifice or orifices.

The shape of the resonators must be such as to give a sufficiently streamlined passage so as to avoid sibilance and throttling of the vibrating air passing through them.

The dimensions to give the best reproduction of human voice sounds should be of the same order as those of the human mouth and throat. Smaller dimensions may be used if the strength of the larynx note is reduced, but if the scale of dimensions be much increased, additional resonances appear which modify the vowel character.

Double resonators of large dimensions may be used to give voice-like sounds of greater volume in cases where exact reproduction of individual vowel sounds is not required.

In the case of human voice production it is well understood that greater carrying power is obtained by the use of nasal resonance.

The same result may be obtained in vowel sounding organ pipes by the addition of a nasal resonator.

Figure 32:
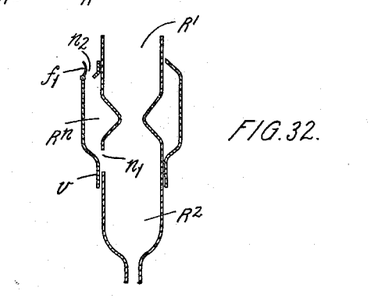
Figure 33:
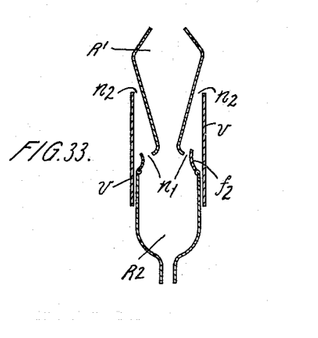

Figs. 32 and 33 show by way of example two convenient constructions in which $R^1$, $R^2$ are the front and back resonators respectively, and $R^n$ is the nasal resonator. Orifices $n^1$ are formed in the resonator $R^2$, which, as shown, is adapted to slide telescopically with reference to $R^2$, so as to vary the area of the orifices of $R^n$ and thus modify its resonant pitch.

In Fig. 32, $R^n$ is formed with a sleeve-like portion $v$ which fits the cylindrical exterior of $R^2$ so that vertical movement of $R^n$ varies the area of the orifice $n^1$ while the external orifice $n^2$ is provided with a flexible metal flap or door $f^1$ by which its area can be adjusted.

In Fig. 33 the orifices $n^1$ are controlled by flaps $f^2$ while the annular orifice $n^2$ is controlled by the vertical movement of $R^n$ relative to the conical exterior of $R^1$.

Figure 34:
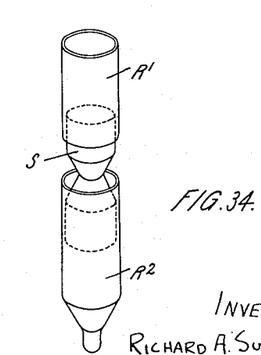

Fig. 34 shows a convenient construction by which the capacities of $R^1$ and $R^2$ may be independently adjusted for voicing purposes namely, by forming the constricted portion S as a separate part with cylindrical ends over which the cylindrical resonators $R^1$, $R^2$ may be telescopically adjusted.

In applying the invention to signal horns, the essential features are a larynx of any desired construction giving a relatively clear tone—such as an organ pipe—reed or syren or a vibrating diaphragm, such as the diaphragm of an electric horn, and a multiple resonator of which the resonances can preferably be varied during phonation.

To reproduce unvoiced consonants in the case of air-blown larynges, the air current must generally be by-passed, as already described with reference to Fig. 19.

In the case of diaphragm larynges, the production of unvoiced sounds is not so easy, since it requires an aperiodic movement of the diaphragm. This can be produced either electrically, by aperiodically breaking the energizing current, as, for example, by an irregularly serrated or roughened moving contact maker or breaker, or mechanically, by causing a similar irregularly and slightly serrated member to actuate the diaphragm itself in a manner well known in the case of mechanically operated diaphragm horns.

For the production of vowel sounds by diaphragm-actuated horns, the vibration of the diaphragm should be such as to give sounds comparable to those of the human larynx. Thus a diaphragm set in vibration by a succession of sharp hammer blows (as in certain types of electrically or mechanically operated horns) is not suitable for producing speech-like signals, since the greater part of the energy of the diaphragm consists of inharmonic overtones of higher frequency than those of the vowel resonances. On the other hand, electromagnetically vibrated diaphragms, or diaphragms mechanically vibrated so as to give a relatively pure larynx note, are well suited to the production of vowel sounds.

Various types of signal horn are illustrated by way of example at Figs. 18A, 19, 20, 21 and 22.

Figure 18A:
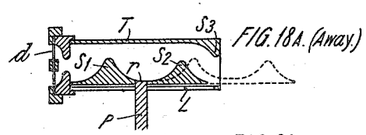
Figs. 18A, 19, 19A, 20, 20A, 21, 21A, 22 and 22A show typical diagrammatic examples of the application of the invention to signal horns.

Fig. 18A shows a variable vowel sounding signal horn suitable for operation by an electrically vibrated diaphragm, in which:—T is a tubular resonator operated by a diaphragm $d$. S1 and S2 are movable stops connected together by a sliding member $r$ and S3 is a fixed stop at the mouth of the tubular resonator.

The movable stops are shown as operated by a downward extension $p$ which passes through a longitudinal slot $q$ in the tubular resonator.

For example in a tubular resonator 150 mm. long x 50 mm. (internal) diameter having a fixed segmental stop (S3) of maximum depth 18 mm. at its open end and movable segmental stops S1, S2, 80 mm. apart of maximum depth 35 mm. x 30 mm. respectively, the following vowel sounds may be formed in succession.

| Distance of back stop from open end | Distance of front stop from open end | Vowel given |
|---|---|---|
| 124 mm | 44 mm | ɐ |
| 80 mm | 0 mm | U |
| 50 mm | Front stop protruding | ei |
| 25 mm | Front stop protruding | I |

By properly timing the movement of the stops—as for example by a motor-driven cam—while the diaphragm is vibrated, the signal "Away!" is sounded.

Fig. 19 has been already described with reference to the production of the consonant L.

Figure 20:
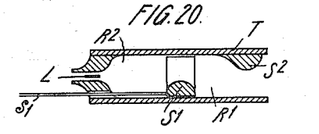
Figure 20A:
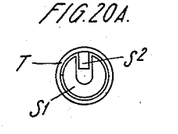

Fig. 20 illustrates a convenient means whereby the area of the inner orifice formed by the movable stop S may by movement of the handle $s^1$ be varied in different positions of the stop, namely, by forming one or more fixed stops S2 of suitable projection so as to cooperate with the projection of $S^1$ to give the requisite area of orifice.

Figure 21:
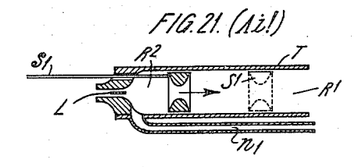

Fig. 21 illustrates diagrammatically an arrangement of signal horn to articulate the signal Ai, in which the resonators $R^1$, $R^2$ are formed of a cylindrical tube T, 50 mm. internal diameter by 150 mm. long, having a sliding stop S of any convenient shape movable by a handle $s^1$, so as to provide a constriction of area equal to that of a circular aperture 24 mm. in diameter.

At 105 mm. from the open end, the vowel sound A (as in up) is given changing, as the stop S is slid forward, to the sound i (as in eat) at 40 mm. from the open end.

To produce an aspirate so as to sound the signal Hi an H-sounding by-pass may be added as described with reference to Fig. 19.

To give increased volume of tone a nasal passage $n^1$ may be added—the capacity of $R^2$ being slightly increased so as to compensate for the rise of resonance due to the aperture through the tube $n^1$.

Figure 21A:
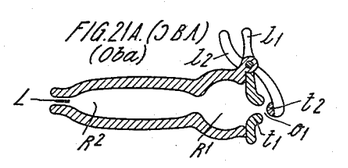

Fig. 21A, shows (diagrammatically) the construction of a signal horn to sound the German warning signal ɔBA (=take care). It may consist for example of a front resonator $R^1$, 60 mm. deep, with a front orifice of 50 mm., and a back orifice 22 to 23 mm. diameter, and a back resonator $R^2$ about 120 mm. long by 30 mm. diameter. The front orifice is provided with a hinged perforated cover $t^1$ operated by the lever $l^1$ and a valve $t^2$ operated by the lever $l^2$ and intended to close or open the perforation or orifice $o^1$ of about 15 mm. diameter in the cover $t^1$.

On opening $o^1$ of the vowel ɔ is produced; on closing $o^1$ and opening $t^1$ during pnonation, the sound A is produced.

Figures 22, 22A:
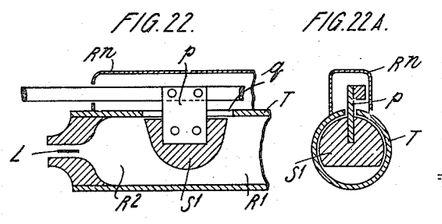

Fig. 22 shows a convenient means for operating a movable stop S by an external rod $r$, connected to the stop S by a plate or web $p$ which passes through a longitudinal slot $q$ in the cylinder R, the aperture formed by the uncovered portion of the slot $q$ may be enclosed within a nasal resonator $R^n$ through which the rod $r$ passes.

The vibrating diaphragm form of larynx may also be applied according to this invention to the production of vowel-sounding instruments by percussion provided the diaphragm is of such a nature as to give, when struck, vibrations of pitch equal to or lower than the lower resonance of the double resonator.

In applying the invention to the production of talking dolls and the like, it is only necessary to substitute properly tuned double resonators, for the single cavities hitherto used, in conjunction with an artificial larynx to produce true vowel sounds. The devices already in use for producing closures and releases are readily applicable to the front orifices or nasal orifices of such double or multiple resonators.

For example, a double resonator of any convenient dimensions giving the resonances 2048 and 483, and fitted with a hinged airtight mouth will produce, on closure, release, closure, release during blowing, the word Baby (bei-bei). The same model with the addition of a nasal orifice will say Mamie, (Mei-Mei).

The invention is also applicable to the production of models for standardizing the vowel sounds of human speech, for which purpose such models have the advantage over phonographic records that the vowel character is independent of the fundamental note or of the air pressure employed, whereas in in phonographic records the vowel character changes with the speed.

By this invention it is also possible to produce a simple apparatus by which vowel sounds of given resonance can be reproduced for purposes of phonetic instruction or the like. Thus apparatus may be made consisting of a larynx communicating with two resonators in series or parallel each of variable capacity or of variable orifice or both, each resonator being provided with convenient means for adjusting it to give any desired resonance within its range, e. g. a cylindrical resonator with variable stops—or flexible resonator with variable constriction.

In this way vowel sounds of previously recorded resonance may be conveniently and quickly reproduced.

Such an apparatus may be constructed as already described with reference to Fig. 6, but having a number of alternative stops such as $r^3$ of different areas of orifice or a single stop of variable orifice which can be adjusted in any desired position, either within the cylindrical tube T or (in addition) at its open end.

Or it may consist of a device such as is shown at Fig. 34, but in which the orifice in the central portion S is made adjustable in area, for example, by means of an external screw operating on a sliding valve or equivalent.

In such devices the back resonance (which is in general the more difficult to identify) may be heard by forming a small opening in the back resonator and holding this to the ear while tapping the resonator.

It will be understood that vowel or consonant sounding resonators with separate larynges or with a larynx in common for a number of multiple resonators, may be combined in various ways, or that the multiple resonances of a single cavity of variable form may be altered by appropriate means so as to produce a succession of sounds without departing from the scope of this invention.

The invention also enables numerous animal sounds, such as the bark of a dog, the quack of a duck and the like to be reproduced with considerable fidelity, e. g. by noting the resonances in a human voice when mimicing the sounds in question without phonation, and reproducing these resonances in the manner above described. Thus a beating reed giving a harsh 322 ~ combined with variable resonators giving 1366/724 changing to 645/304 will give a good imitation of the bark of a small dog.

An apparatus to imitate the Hee-haw (i-ɒ) of a donkey may consist of a cylindrical tube 50 mm. diameter x 150 mm. long similar to that shown in Fig. 21 (with or without a nasal tube) having a larynx at one end and a movable stop, giving an inner orifice equal to a circle of 12 mm. operated by an exterior handle or cord. The stop may be normally held in its forward position with the centre of the inner orifice about 50 mm. from the open end (corresponding to the vowel sound i) by a spring. On pulling the cord or operating an equivalent handle, so as to withdraw the stop to its rearward position—130 mm. from the open end—during blowing, either by mouth or some form of bellows, the ɒ sound is produced. The dimensions above mentioned may be proportionately reduced without appreciably altering the character of the vowel sounds.

Similarly the quack of a duck may be reproduced by resonators giving 512/304 changing rapidly to 1366/512 with a reed, with throttled passage, giving 152 ~

The details of construction of the embodiments of the invention to suit these various applications would of course be modified accordingly.

Having now particularly described and ascertained the nature of my said invention and in what manner the same is to be performed, I declare that what I claim is:—

1. The combination of two resonators each tuned to the pitch of one component of the unvoiced counterpart of the speech-like sound to be reproduced, a device fitted to the rear orifice of the back resonator and adapted to supply the said resonator with a periodic vibrating current of air, and a connecting orifice between the resonators forming the front orifice of the back resonator and the rear orifice of the front resonator.

2. The combination of two resonators each tuned to the pitch of one component of the unvoiced counterpart of the speech-like sound to be reproduced, a device fitted to the rear orifice of the back resonator and adapted to supply the said resonator with an aperiodic vibrating current of air, and a connecting orifice between the resonators forming the front orifice of the back resonator and the rear orifice of the front resonator.

3. The combination with the elements claimed in claim 1, of means for varying the pitch of one of the resonators.

4. The combination with the elements claimed in claim 1, of means for varying the closure of the front orifice of the front resonator.

5. The combination with the elements claimed in claim 1, of means for varying the pitch of the front resonator and for varying the closure of the front resonator.

6. The combination of a plurality of resonators each tuned to the pitch of one component of the unvoiced counterpart of the speech-like sound to be produced, certain of the resonators giving consonant sounds and certain of the resonators giving vowel sounds, a vibrating air supply, and means controlling the air supply to the several resonators so as to produce the said sounds in succession.

7. The combination of a plurality of resonators each tuned to the pitch of one component of the unvoiced counterpart of the speech-like sound to be reproduced, an energizing means for producing the required fluctuations of air pressure within the resonators to evoke their resonances, and forming the walls of the resonators of a flexible substance adapted when subjected to pressure to constrict the orifice between the resonators.

8. The combination of a plurality of resonators each tuned to the pitch of one component of the unvoiced counterpart of the speech-like sound to be reproduced, an energizing means for producing the required fluctuations of air pressure within the resonators to evoke their resonances, forming the walls of the resonators of a flexible substance adapted when subjected to pressure to constrict the front orifice of the front resonator.

9. The combination of a plurality of resonators each tuned to the pitch of one component of the unvoiced counterpart of the speech-like sound to be reproduced, an energizing means for producing the required fluctuations of air pressure within the resonators to evoke their resonances, and forming the walls of the resonators of a flexible substance adapted when subjected to pressure to vary the pitch of one of the resonators.

10. The combination of a plurality of resonators each tuned to the pitch of one component of the unvoiced counterpart of the speech-like sound to be reproduced, an energizing means for producing the required fluctuations of air pressure within the resonators to evoke their resonances, and forming the walls of the resonators of a flexible substance adapted when subjected to pressure to constrict the orifice between the resonators and to constrict the front orifice of the front resonator.

11. The combination of a plurality of resonators each tuned to the pitch of one component of the unvoiced counterpart of the speech-like sound to be reproduced, an energizing means for producing the required fluctuations of air pressure within the resonators to evoke their resonances, and making a portion of the wall of one of the resonators flexible.

In witness whereof I set my hand.

R. A. S. PAGET.